United States Patent Office
2,909,157
Patented Oct. 20, 1959

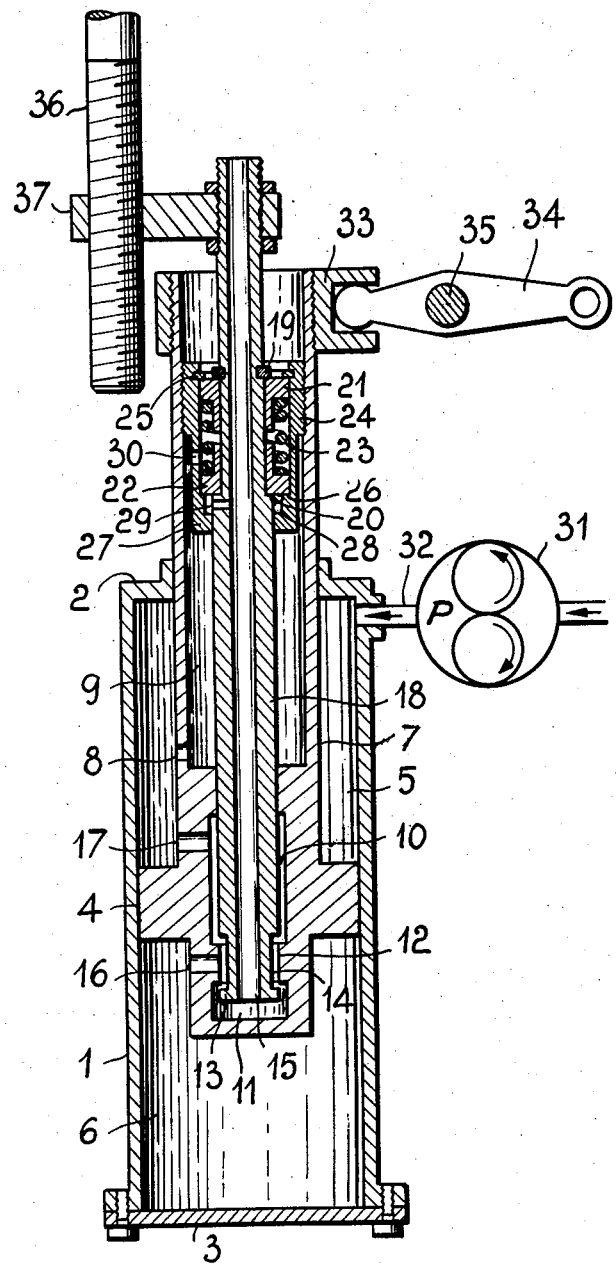

2,909,157

FLUID PRESSURE MOTOR, PARTICULARLY FOR VEHICULAR POWER STEERING

Smil Reis, Milan, Italy

Application May 31, 1955, Serial No. 512,088

Claims priority, application Italy June 9, 1954

6 Claims. (Cl. 121—41)

This invention relates to a fluid-pressure-operated power steering mechanism for motor vehicles, and its object is to provide an improved mechanism of this character which shall be simple, compact and reliable.

One of the difficulties of power steering mechanism using fluid pressure is the rather complicated valve mechanism required to control the supply and the discharge of pressure fluid for moving the steering mechanism in two directions. Another difficulty, found when the motor mechanism is a double-acting piston and cylinder, arises from the fact that it is difficult to avoid having a piston rod which reduces the effective area of the cylinder space on one side of the piston as compared with the effective area of the space on the other side of the piston and this tends to unbalance the motor mechanism.

The present invention deliberately uses a double-acting piston and cylinder in which the effective area of the space on one side of the piston is greater than that of the space on the other side and takes advantage of the resulting unbalance to reduce the control device required to a simple valve. This is achieved in accordance with the invention by a construction wherein the motor mechanism is a double-acting piston and cylinder designed to actuate the steering mechanism by means of a hollow piston rod which projects through one end of the cylinder so that the cylinder space on one side of the piston is of smaller effective area than the cylinder space on the other side of the piston, and wherein the control device is a check valve carried by the piston and connected to the steering control member by means of a valve rod extending through the hollow piston rod, provision being made for supplying fluid under pressure to the cylinder space of smaller effective area, and the valve being arranged to cause movement of the piston in one direction by unblocking an opening through which fluid flows from the space of smaller effective area to the space of larger effective area and at the same time obstructing an opening through which fluid escapes from the space of larger effective area to exhaust, whereas movement in the opposite direction is caused by obstructing the first opening and at the same time unblocking the second opening.

The invention and its subsidiary features will be fully understood from the following description, by way of example, of one embodiment of the invention, reference being made to the accompanying drawing in which the power steering mechanism of a vehicle is diagrammatically illustrated in longitudinal sectional view.

As shown in the drawing, a cylinder 1 is closed by end covers 2 and 3. A piston 4, movable in the cylinder 1, divides the bore of said cylinder 1 into two compartments or cylinder spaces 5 and 6, one at each side of the said piston 4. A tubular piston rod 7 is solidly fastened to the piston 4 at the side facing rear compartment 5. The bore 9 of said tubular piston rod is connected to the cylinder space 5 by ports 8 in the wall of the piston rod. The piston rod 7 extends outside the space 5 through a central hole in the end cover 2. Sealing means (not shown in the drawing) between this hole and the piston rod 7 prevent the escape of pressure fluid fed to the space 5. The diameter of the rod 7 is smaller than that of the piston 4. Thus, the effective area of the piston on the side facing the space 5 is smaller than the area of the opposite side of the same piston facing the space 6. Thus, also, the effective area of the space 5 is smaller than that of the front space 6. The ports 8 are placed in a position where they will always remain inside the compartment 5, even when the piston 4 reaches the end of its stroke towards the end 2 of the cylinder. A central bore extending through the piston 4 and closed at the end remote from the rod 7 is divided into two compartments 10 and 11 by an intermediate wall or diaphragm 12, said wall having a central circular hole. A cylindrical, spool-type valve 13, formed by two axially spaced flanges on a rod 18 acting as a valve stem, is arranged slidable in and coaxial with the said hole in the wall 12. The outside diameter of valve 13 is equal to that of the hole in the wall 12. An annular recess 14, separating the flanges of valve 13, is located inside the circular hole of the wall 12, and the width of the said recess is greater than the thickness of the wall 12. Consequently, in the position shown, the valve compartments 10 and 11 are intercommunicating. But when the valve 13 is shifted up or down, with reference to the drawing, until the respective edges of the parts 12 and 14 are in contact, intercommunication between the compartments 10 and 11 will be broken. An axial hole 15 in the valve 13 connects either both compartments 10 and 11 or only the compartment 11 to exhaust, depending upon the position of valve 13, according to whether it is positioned as shown in the drawing or shifted downwards with reference to the drawing. Ports 16 in the intermediate wall 12 connect the compartment 6 to the recess 14. Ports 17 in a hub of piston 4 connect the valve compartment 10 to the cylinder compartment 5.

The tubular valve stem 18 is fastened co-axially to the valve 13. The central hole 15 of valve 13 is continued through the internal bore of the tubular rod 18 to its outer end.

The assembly 13—18 is located internally and coaxially with respect to the assembly 4—7. Two annular pistons 21 and 22 are arranged to be slideable on the valve stem 18 between two stops 19 and 20 attached to the valve stem 18. Between the said annular pistons is arranged a spring 23, which keeps the pistons pressed against the stops 19 and 20. The annular pistons 21 and 22 are also slidable in a cylinder 24 between stops 25 and 26 provided in the cylinder 24 and spaced apart by exactly the same distance as the stops 19 from 20, said cylinder 24 being screwed into the end of the piston rod 7 so as to close its bore 9. The cylinder 24 and its stops 25 and 26 control the normal position of the valve 13 relatively to the piston 4, and the normal position of the valve can thus be adjusted by adjusting the location of the cylinder 24 in the piston rod 7. An end cover 27 closes the cylinder 24 towards the bore 9 of the piston rod 7. The end cover 27 is fixed to the cylinder 24 at a certain distance from the stops 20 and 26, so that an annular space 28 is left between the parts 22 and 27. A central hole in the end cover 27 allows the valve stem 18 to pass through the cylinder 24. Between the valve stem 18 and the central hole of the end cover 27 are included sealing means for preventing any passage of the pressure fluid between the spaces 9 and 28. A port 29 in the wall of the valve rod 18 connects the internal bore of the valve rod with the annular space 28. Ports 30 in the wall of the cylinder 24 connect the bore 9 of the piston rod 7 with the space within the cylinder 24 between the annular pistons 21 and 22.

A member 33 fastened to the end of the piston rod 7 is operatively connected to one arm of the two-armed lever 34 pivotally supported at 35. The pivot 35 is fixed. A nut 37 is fastened to the end of the valve rod 18. A bolt 36 screwed into nut 37 is operatively connected to a steering control member of the vehicle (not shown in the drawing). The free arm of the double arm lever 34 is linked to the steered mechanism of the vehicle (not shown in the drawing). A pump 31, driven by the engine of the vehicle (not shown in the drawing) or by any other power source, feeds the pressure fluid to the cylinder compartment 5 through a pipe 32 which connects said compartment to the delivery of the pump.

The power steering mechanism according to the invention works as follows:

Normally, the valve 13 assumes an intermediate position with reference to the wall 12, as shown in the drawing. The pressure fluid fed by the pump 31 flows freely through the passages 32—5—17—10—14—11—15, and at the same time enters the space 6 through the forward port 16. When the screw 36 is rotated by the steering control member, the valve 13 is shifted axially, for instance downwards with reference to the drawing. The path extending from rear port 17 to recess 14 for the passage of fluid from the space 5 to the space 6 is thus blocked, whereas the passage from the space 6 to the exhaust opening remains open. Thus, the pressure of the fluid fed to the space 5 by the pump 31 will rise, driving the piston 4 downwards with reference to the drawing. The piston 4, in turn, will turn the steered wheels in one direction, through the parts 7, 33, 34 and the usual steering linkage (not shown). As the valve 13 moves downwards, it moves the piston 21 downwards by means of the stop 19 against the reaction of spring 23 and the fluid pressure existing between the annular pistons 21 and 22. This reaction is transmitted through the steering control member to the operator, who is thus able to feel the steering work he is doing. It will be noted that the piston 4 follows the downward motion of the valve 13, thus tending to re-open the passage between the spaces 10 and 14 and thereby stopping itself. If the valve 13 is shifted upwards with reference to the drawing, the opening for the passage of fluid from the space 14 to the space 11 is obstructed so that pressure builds up in the space 6. In this case, the fluid pressure acts on both sides of the piston 4, but, owing to the fact that the effective area of the piston on the side facing the compartment 5 is smaller than that on the side facing the larger compartment 6, a resultant thrust is produced which moves the piston upwards with reference to the drawing, thus reversing the direction in which the wheels are steered. Also in this case the piston 4 follows the valve 13, thus tending to re-open the outflow of the pressure fluid and eventually stopping its own motion. Besides this, when the valve 13 is moved upwards, the annular piston 22 is moved against the spring 23 and the fluid pressure between the piston 21 and 22, so that their reaction on 22 will give the operator a sense of the steering work he is doing. The changes in volume of the annular space 28 due to the motion of the annular piston 22 do not affect the reaction of this piston, the space 28 being in permanent communication with the outflow through the port 29.

Any action of the road on the steered wheels of the vehicle is transmitted to the piston 4, tending to move this piston with reference to the valve 13. If the valve 13 is held still by the steering control, the piston 4 will tend to shut the passage between the spaces 10 and 14 or 14 and 11, depending on whether the piston 4 is moved upwards or downwards with reference to the drawing. Therefore, the resultant fluid pressure acting on the piston 4 will push it downwards or upwards, thereby balancing the reaction of the road and keeping the steered wheels on their path. The effort required to hold the valve 13 still must overcome only the thrust due to spring 23 and the fluid pressure on one of the annular pistons 21 and 22. In this case, the power steering mechanism operates as a safety device. If, instead, the valve 13 is released by the operator, then the reaction of the road will move both the piston 4 and the valve 13 together without any appreciable reaction of the pressure fluid. In this way, the vehicle can straighten out by itself at the end of a curve.

Certain clarifying terms such as "front" and "rear," used hereinabove and in the appended claims, are to be understood in a relative sense only and are not intended to limit the invention to a system having any particular orientation with respect to a vehicular steering mechanism or other apparatus controlled thereby.

I claim:

1. In a vehicular power steering system having steering-control means and a controlled steering mechanism, in combination, a cylinder having a chamber, a piston movable in said chamber and dividing it into a front and a rear compartment, a hollow stem extending from the rear face of said piston axially through said rear compartment, said stem substantially reducing the effective area of said rear piston face with respect to the forward piston face, a source of pressure fluid connected with said rear compartment, said piston being inwardly hollow and having a first substantially radially extending port connecting said rear compartment with the interior of said piston and a second substantially radially extending port connecting said front compartment with the interior of said piston at axially spaced locations, an elongated valve member axially slidable in said piston and forming therewith a fluid passage communicating with said first and second ports, said valve member being provided with an exhaust channel communicating with said passage at a location forwardly of said second port, said piston and said valve member being provided with a first and a second pair of co-acting shoulders so positioned in said passage rearwardly and forwardly, respectively, of said second port that said first pair of shoulders co-operate in a forward and a rear limiting axial position of said valve member relative to said piston for cutting off said second port from said first port and from said exhaust channel, respectively, resilient centering means operatively connected between said piston and said valve member for urging the latter into an intermediate position wherein said shoulders are out of register and wherein said rear compartment communicates by way of said first port and said passage with said exhaust channel and also through said second port with said front compartment whereby said pressure fluid is discharged through said exhaust channel without effectively acting upon said piston, first link means connecting said valve member with said steering-control means for selectively displacing said valve member to said forward limiting position, in which said fluid is confined to said rear compartment and exerts a forward pressure upon said piston, and to said rear limiting position, in which said fluid is confined to said front and rear compartments and exerts a differential rearward pressure upon said piston, and second link means connecting said piston with said controlled steering mechanism, said exhaust channel terminating at a discharge opening located axially beyond said chamber.

2. The combination according to claim 1 wherein said stem has a portion surrounding with substantial clearance a part of said valve member remote from said fluid passage, said centering means comprising a pair of axially spaced internal abutments on said stem portion, a pair of axially spaced stops on said member, a first and a second spring-supporting element slidably positioned on said member with freedom of relative axial motion between said stops and said abutments, and spring means bearing upon said elements in a sense urging one of said elements into simultaneous engagement with one of said stops and one of said abutments while urging the other of said elements into simultaneous engagement with the other of said stops and the other of said abutments.

3. The combination according to claim 2, further comprising a spring housing in said clearance rigid with said stem portion, said housing carrying said abutments and forming an enclosure about said elements and said spring means, said housing being provided with a first aperture communicating with the interior of said stem, said stem being provided with a second aperture connecting its interior with said rear compartment whereby fluid from said source is admitted into said spring housing by way of said apertures.

4. The combination according to claim 2 wherein said shoulders are formed by an internal projection on said piston and a recess on said valve member facing said projection, said recess having an axial extent greater than that of said projection, said second port traversing said projection.

5. In a vehicular power steering system having steering-control means and a controlled steering mechanism, in combination, a cylinder having a chamber of constant diameter, a piston movable in said chamber, said piston having a single head dividing said chamber into a front and a rear compartment and further having a hollow stem extending rearwardly from the rear face of said head out of said cylinder, said stem substantially reducing the effective area of said rear face with respect to the forward face of said head, a source of pressure fluid connected with said rear compartment, an elongated valve rod passing with substantial clearance through a portion of said stem remote from said head and having a rear extremity projecting from said stem, said head and adjacent portions of said stem forming a restricted annular fluid passage around said rod, said adjacent portions being provided with a first radial port rearwardly of said head and with a second radial port forwardly of said head connecting said passage with said rear compartment and with said front compartment, respectively, said rod being provided with an axially extending exhaust channel terminating in a discharge opening at said projecting extremity, said stem forming a fluid space forwardly of said second port communicating with both said passage and said exhaust channel, said stem having an inner annular flange projecting toward said rod to an extent equaling the width of said passage, said rod being provided with an annular recess facing said flange, said recess having an axial extent greater than that of said flange whereby a portion of said passage is inwardly offset from the remainder, said second port entering said offset portion of said passage, first link means connecting said rod with said steering-control means for selectively displacing said rod relatively to said stem to a forward position in which said flange cuts off said recess from said first port, whereby said fluid is confined to said rear compartment and exerts a forward pressure upon said head, and to a rear position in which said flange cuts off said recess from said fluid space, whereby said fluid is confined to said front and rear compartments and exerts a differential rearward pressure upon said head, second link means connecting said piston with said controlled steering mechanism, and resilient centering means in said remote stem portion operatively connected between said stem and said rod for urging the latter into an intermediate position in which said flange is substantially centered with respect to said recess whereby both of said compartments communicate with said fluid space by way of said passage and said pressure fluid is discharged through said exhaust channel without effectively acting upon said piston.

6. The combination according to claim 5 wherein said centering means comprises a spring housing rigid with said stem surrounding said rod, said housing being provided with a pair of axially spaced internal abutments, a pair of axially spaced stops on said rod substantially aligned with said abutments in said intermediate position, a first and a second spring-supporting element slidably positioned on said rod inside said housing with freedom of relative axial motion between said stops and said abutments, and spring means in said housing bearing upon said elements in a sense urging one of said elements into simultaneous engagement with one of said stops and one of said abutments while urging the other of said elements into simultaneous engagement with the other of said stops and the other of said abutments, said housing being provided with a first radial aperture communicating with the interior of said stem, said remote stem portion being provided with a second aperture connecting its interior with said rear compartment whereby fluid from said source is admitted into said spring housing by way of said apertures.

References Cited in the file of this patent

UNITED STATES PATENTS

| | | |
|---|---|---|
| 773,365 | Atkins | Oct. 25, 1904 |
| 1,790,620 | Davis | Jan. 27, 1931 |
| 2,088,520 | Huguenin | July 27, 1937 |
| 2,670,715 | Conway | Mar. 2, 1954 |
| 2,721,072 | Zuhn | Oct. 18, 1955 |
| 2,722,199 | Blanchette | Nov. 1, 1955 |
| 2,769,502 | Ziskal | Nov. 6, 1956 |